United States Patent [19]
Hall et al.

[11] Patent Number: 5,502,370
[45] Date of Patent: Mar. 26, 1996

[54] POWER FACTOR CONTROL CIRCUIT HAVING A BOOST CURRENT FOR INCREASING A SPEED OF A VOLTAGE CONTROL LOOP AND METHOD THEREFOR

[75] Inventors: Jeff W. Hall; Steven M. Barrow, both of Phoenix; Jade H. Alberkrack, Tempe; Eric W. Tisinger, Chandler, all of Ariz.

[73] Assignee: Motorola, Inc., Schaumburg, Ill.

[21] Appl. No.: 300,545

[22] Filed: Sep. 6, 1994

[51] Int. Cl.⁶ .......................... G05F 1/40; H02M 3/335
[52] U.S. Cl. .......................................... 323/284; 363/21
[58] Field of Search .................................. 323/226, 273, 323/274, 282, 284; 363/21, 23, 25

[56] References Cited

U.S. PATENT DOCUMENTS

| | | | |
|---|---|---|---|
| 5,220,272 | 6/1993 | Nelson | 323/282 |
| 5,264,780 | 11/1993 | Bruer et al. | 323/284 |
| 5,359,281 | 10/1994 | Barrow et al. | 323/284 |
| 5,367,247 | 11/1994 | Blocher et al. | 323/222 |
| 5,373,225 | 12/1994 | Poletto et al. | 323/282 |
| 5,382,918 | 1/1995 | Yamatake | 330/260 |
| 5,414,610 | 5/1995 | Brainard | 363/21 |
| 5,424,933 | 6/1995 | Illingworth | 363/21 |
| 5,440,473 | 8/1995 | Ishii et al. | 363/21 |

*Primary Examiner*—Matthew V. Nguyen
*Attorney, Agent, or Firm*—Gary W. Hoshizaki

[57] ABSTRACT

An integrated power factor control circuit (12) for keeping an average AC line current sinusoidal and in phase with the line voltage. The integrated power factor control circuit (12) provides a boosted DC voltage greater than the amplitude of the line voltage. A transconductance amplifier (16) provides a boosted source and sink current when an output voltage is significantly out of regulation. The boosted source and sink current of the transconductance amplifier (16) increases the speed in which the voltage control loop can react to an output voltage change and reduces the time needed to generate the regulated voltage under startup. A comparator (17) provides a boost current at start up and senses a no-load condition during normal operation. The comparator (17) senses the no-load condition and stops switching to eliminate further output charging before an out of range condition occurs.

11 Claims, 3 Drawing Sheets

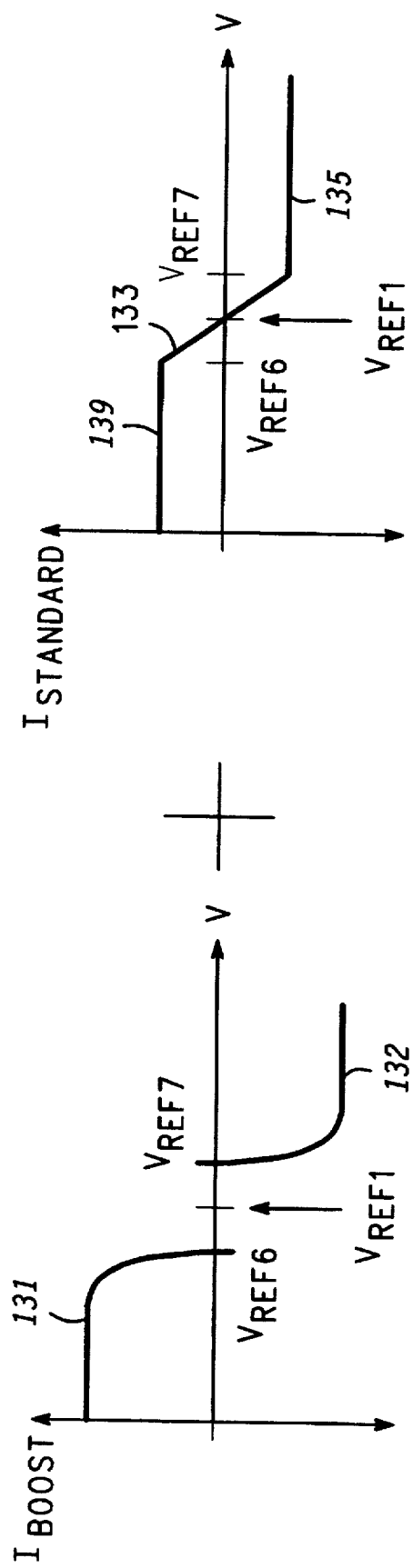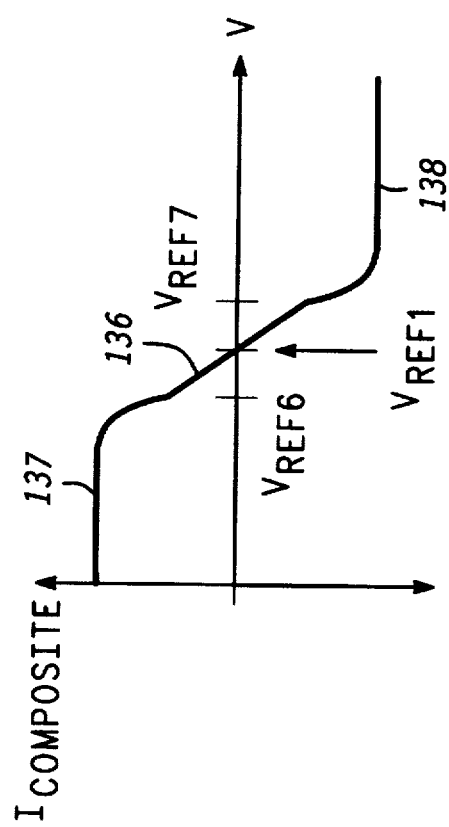
FIG. 3

POWER FACTOR CONTROL CIRCUIT HAVING A BOOST CURRENT FOR INCREASING A SPEED OF A VOLTAGE CONTROL LOOP AND METHOD THEREFOR

BACKGROUND OF THE INVENTION

This invention relates, in general, to circuits for converting electrical power, and more particularly, to power factor controllers.

Many types of circuits derive a DC voltage from an AC utility line through a bridge rectifier and a bulk storage capacitor. A rectifying circuit will draw power from the AC utility line when the voltage on the AC utility line exceeds the voltage on the bulk storage capacitor. Power is typically supplied near the utility line peak voltage causing a high charge current spike. The resulting current spikes are extremely nonsinusoidal with a high content of harmonics which results in a poor power factor condition where the input power is much higher than the real power.

A power factor control circuit significantly enhances poor power factor loads by keeping the average AC line current sinusoidal and in phase with the line voltage. A power factor control circuit provides a DC voltage and operates linearly around a nominal or central point of regulation. In general the linear operation is within a narrow range around the regulation point. A power factor control circuit does not respond rapidly when the output is out of regulation by a significant margin. For example, the power factor control circuit will take a significant amount of time to reach the regulation point during initial power up.

Within the narrow range in which the power factor control circuit provides regulation high currents may be provided depending on the loading to the circuit. No load conditions present a regulation problem since a high charging current to the bulk storage capacitor will cause a significant increase in voltage which is generally diverted to the load. No load regulation is normally handled by an overvoltage detection circuit which shuts off drive to the bulk storage capacitor when the output voltage exceeds a predetermined voltage.

It would be of great benefit if a power factor control circuit could be provided that rapidly approaches the regulation point when out of regulation and reduces output voltage variations under no load conditions.

BRIEF DESCRIPTION OF THE DRAWINGS

FIG. 3 is a diagram illustrating a voltage versus current response of the transconductance amplifier of FIG. 2.

DETAILED DESCRIPTION OF THE DRAWINGS

Figure 1:
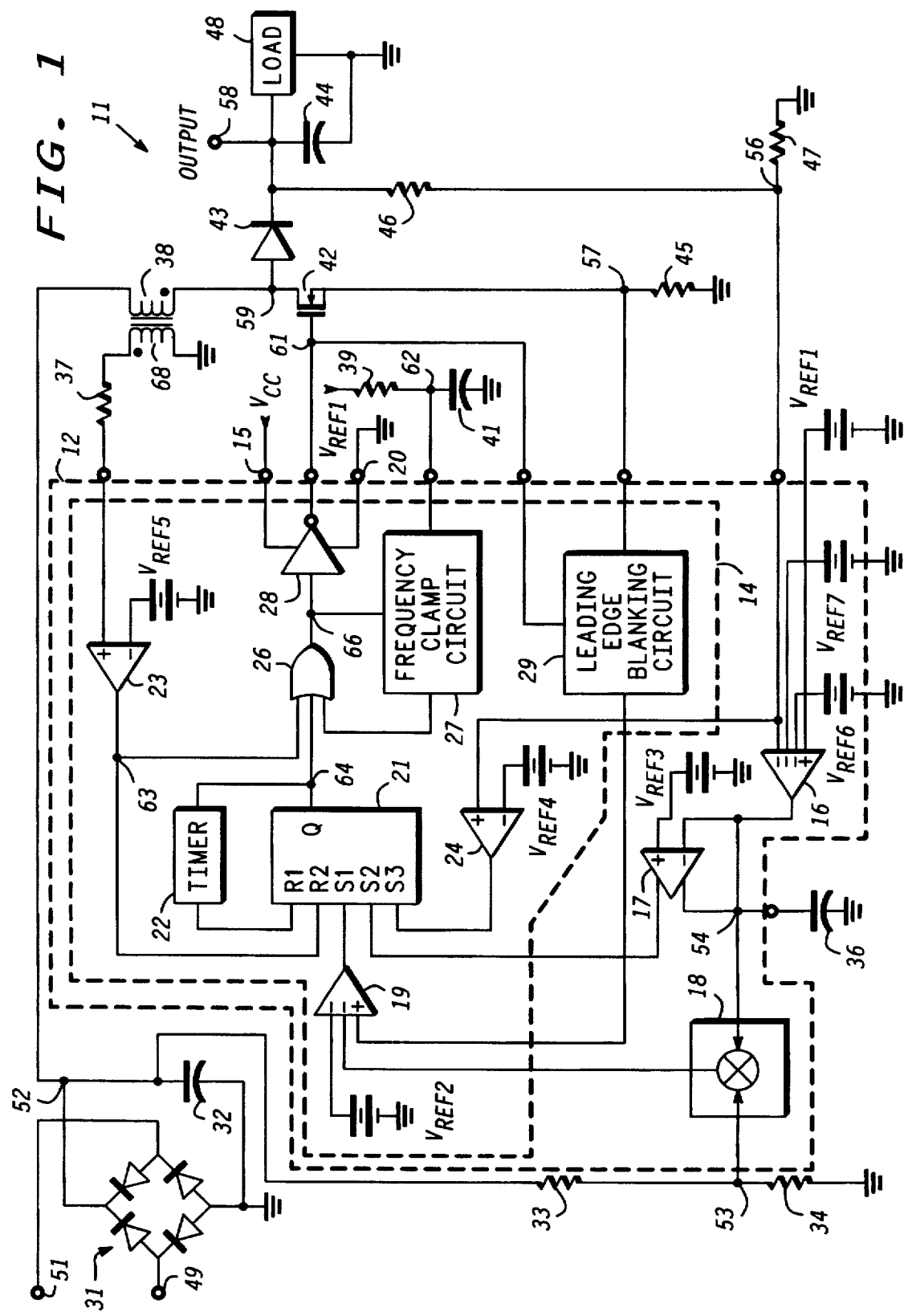
FIG. 1 is a schematic diagram of an integrated power factor control circuit and peripheral circuitry in accordance with the present invention.

An integrated power factor control circuit 12 is illustrated in FIG. 1. An active approach such as that shown in FIG. 1 operates at a frequency significantly higher than the AC line frequency and thus is smaller, and lighter in weight, and more efficient than a passive circuit. A passive circuit comprises a combination of capacitors, inductors, and rectifiers which operate at the line frequency. Integrated power factor control circuit 12 keeps the average AC line current sinusoidal and in phase with the line voltage thereby efficiently delivering power to a load. Integrated power factor control circuit 12 includes circuitry for decreasing time to regulation (settling time) and for providing better regulation under no load conditions.

Integrated power factor control circuit 12 comprises a control circuit 14, a transconductance amplifier 16, a comparator 17, and a multiplier 18. In the preferred embodiment, integrated power factor control circuit 12 is formed as a single integrated circuit.

Control circuit 14 senses the voltage at an output 58 and current through inductor 38 for providing control signals to regulate the voltage at output 58 and keep the average AC line current sinusoidal and in phase with the line voltage. Control circuit 14 comprises a timer 22, a latch 21, OR gate 26, buffer 28, frequency clamp circuit 27, leading edge blanking circuit 29, comparators 19, 23, and 24. A power supply voltage Vcc and ground are respectively applied to a terminal 15 and 20 of power factor control circuit 12. The power supply voltage Vcc and ground are shown coupled to only buffer 28 but actually powers all circuits of power factor control circuit 12 and are not shown as being coupled to simplify the figure.

Latch 21 of control circuit 14 includes reset inputs R1 and R2, set inputs S1, S2, and S3, and a Q output. The reset input R2 of latch 21 is coupled to a node 63 and the Q output of latch 21 is coupled to a node 64. Timer 22 of control circuit 14 has an input coupled to node 64 and an output coupled to the reset input R1 of latch 21. Comparator 23 of control circuit 14 has a non-inverting input, an inverting input coupled to a reference voltage Vref5, and an output coupled to node 63. OR gate 26 of control circuit 14 has a first input coupled to node 63, a second input coupled to node 64, a third input, and an output coupled to a node 66. Buffer 28 of control circuit 14 has an input coupled to node 66 and an output coupled to a node 61. Frequency clamp circuit 27 of control circuit 14 has a first input coupled to node 66, a second input coupled to a node 62, and an output coupled to the third input of OR gate 26. Comparator 19 of control circuit 14 has a first inverting input coupled for receiving a reference voltage Vref2, a second inverting input coupled to the output of multiplier 18, a non-inverting input, and an output coupled to the set input S1 of latch 21. Leading edge blanking circuit 29 of control circuit 14 has a first input coupled to node 61, a second input coupled to node 57, and an output coupled to the non-inverting input of comparator 19. Comparator 24 of control circuit 14 has an inverting input coupled for receiving a reference voltage Vref4, a non-inverting input coupled to node 56, and an output coupled to the set input S3 of latch 21.

Transconductance amplifier 16 includes an inverting input coupled to a node 56, a non-inverting input coupled for receiving a reference voltage Vref1, a first terminal coupled for receiving a voltage reference Vref6, a second terminal coupled for receiving a voltage reference Vref7, and an output coupled to a node 54. Comparator 17 includes a inverting input coupled to node 54, a non-inverting input coupled for receiving a reference voltage Vref3, a first output coupled to a set input S2 of latch 21, and a second output coupled to node 54. Multiplier 18 has a first input coupled to node 54, a second input coupled to a node 53, and an output.

A host of components external to integrated power factor control circuit 12 are illustrated in FIG. 1. A bridge rectifier 31 includes terminals 49 and 51 for receiving a utility line voltage (for example, 120 volts AC at 60 hertz), a terminal coupled to ground and an output coupled to a node 52 for providing voltage rectification. A capacitor 32 is coupled between node 52 and ground. A resistor divider for providing a voltage to multiplier 18 comprises a resistor 33 and a resistor 34. Resistor 33 has a first terminal coupled to node 52 and a second terminal coupled to node 53. Resistor 34 has a first terminal coupled to node 53 and a second terminal coupled to ground.

An inductor 38 couples current from capacitor 32 and bridge rectifier 31 through diode 43 to output 58. Inductor 38 includes a first terminal coupled to node 52, a second terminal coupled to a node 59, a third terminal, and a fourth terminal coupled to ground. The third and fourth terminals couple to an auxiliary winding for sensing the conduction state of inductor 38. A resistor 37 has a first terminal coupled to the non-inverting input of comparator 23 and a second terminal coupled to the third terminal of inductor 38. Resistor 37 limits current into the non-inverting input of comparator 23.

A diode 43 for coupling current to output 58 has an anode coupled to node 59 and a cathode coupled to output 58. A transistor 42 has a drain coupled to node 59, a gate to node 61, and a source 57, respectively corresponding to a first electrode, a control electrode, and a second electrode. In the preferred embodiment, transistor 42 is a power MOSFET (Metal Oxide Semiconductor Field Effect Transistor). A resistor 45 has a first terminal coupled to node 57 and a second terminal coupled to ground. A capacitor 36 has a first terminal coupled to node 54 and a second terminal coupled to ground. A resistor divider for generating a voltage corresponding to an output voltage comprises resistors 46 and 47. Resistor 46 has a first terminal coupled to output 58 and a second terminal coupled to node 56. Resistor 47 has a first terminal coupled to node 56 and a second terminal coupled to ground. A capacitor 44 has a first terminal coupled to output 58 and a second terminal coupled to ground. A load 48 couples between output 58 and ground. A resistor 39 has a first terminal coupled for receiving the voltage reference Vref1 and a second terminal coupled to node 62. A capacitor 41 has a first terminal coupled to node 62 and a second terminal coupled to ground.

Operation of integrated power factor control circuit 12 is described hereinafter. In the preferred embodiment, integrated power factor control circuit 12 provides a voltage boost function generating a DC output voltage greater than the amplitude of an input line signal. An AC line signal (120 volt AC) is applied to terminals 49 and 51 of bridge rectifier 31. Bridge rectifier 31 provides rectified line voltage signal at node 52. Capacitor 32 couples to node 52 filtering switching transients. A startup condition occurs when integrated power factor control circuit 12 is powered up. If capacitor 44 is discharged, it is charged up to the peak voltage of the line during a time period while power supply voltage Vcc and voltage references Vref1-7 stabilize. In the preferred embodiment, voltage references Vref1-7 are generated from a band gap reference (not shown).

Integrated power factor control circuit 12 starts to regulate an output voltage at output 58 after the power supply voltage and voltage references stabilize. Integrated power factor control circuit 12 also controls the input current from the AC line. Timer 22 initiates output switching of transistor 42 and periodically starts a charging sequence to insure that the output voltage remains regulated. Timer 22 resets latch 21 generating a logic zero level at the Q output. OR gate 26 outputs a logic zero level which is inverted by buffer 28 thereby providing a logic one level to the gate of transistor 42 which enables the device for conduction. A current couples through inductor 38 and transistor 42 that generates a voltage across resistor 45.

Parasitic capacitance during initial turn on creates a voltage spike that could switch off transistor 42 prematurely. Leading edge blanking circuit 29 prevents a voltage spike from being coupled to comparator 19. In the preferred embodiment, leading edge blanking circuit 29 is switch circuitry that couples the non-inverting input of comparator 19 to node 57 after the leading edge voltage spike has passed.

The voltage rises linearly across resistor 45 and couples to the non-inverting terminal of comparator 19. The voltage at node 57 is compared against a reference voltage generated at the output of multiplier 18 which is coupled to the second inverting input of comparator 19. The reference voltage of multiplier 18 is a product of the sampled full wave bridge rectified sinusoidal signal at node 52 and an output voltage of transconductance amplifier 16. The sampled full wave bridge rectified sinusoidal signal is reduced in magnitude at node 53 by the resistor divider comprising resistors 33 and 34 and coupled to the second input of multiplier 18.

The output voltage provided by transconductance amplifier 16 is part of a voltage control loop which samples the output voltage at output 58. The resistor divider comprising resistors 46 and 47 generate a voltage at node 56 corresponding to the output voltage at output 58. Transconductance amplifier 16 compares the magnitude of the output voltage at output 58 to the reference voltage Vref1. A first condition occurs when the voltage at node 56 is less than the reference voltage Vref1. Transconductance amplifier 16 sources current into capacitor 36 which increases the voltage at node 54. The increasing voltage at the output of multiplier 18 prevents latch 21 from being set thereby increasing the time that transistor 42 is enabled which develops a larger voltage across resistor 45. A second condition occurs when the output voltage at output 58 is above regulation, the voltage at node 56 is greater than Vref1 causing transconductance amplifier 16 to sink current from capacitor 36 reducing the voltage at node 54. The output voltage of multiplier 18 decreases causing comparator 19 to set latch 21 which disables transistor 42. Mixing the voltage loop control with the full wave bridge rectified sinusoidal signal controls the average input current waveform to be a sinusoid providing a power factor controlled input signal. The reference voltage Vref2 coupled to the first inverting input of comparator 19 limits the maximum voltage at node 57 to prevent inductor 38 from saturating by turning off transistor 42 when Vref2 is exceeded.

The output of latch 21 will remain in a logic zero level as long as the non-inverting input of comparator 19 is below the reference voltage generated at the output of multiplier 18. In this state, latch 21 is reset and node 61 is at a logic one level such that power switch 42 is enabled. The output of latch 21 will transition to a logic one level when the voltage at node 57 exceeds the reference voltage provided at the output of multiplier 18 causing transistor 42 to be disabled. The voltage at the drain of transistor 42 will increase as inductor 38 transfers its stored energy through diode 43 to capacitor 44 and load 48.

A sense winding 68 on inductor 38 monitors when all the energy of inductor 38 is transferred to capacitor 44 and load 48. Resistor 37 limits the current through sense winding 68. A voltage at the non-inverting input of comparator 23 is greater than Vref5 when energy is initially transferred from inductor 38 thereby setting the output of comparator 23 to a logic one level. This signal resets the latch but holds the gate of transistor 42 at a logic zero level by coupling the logic one level at the output of comparator 23 to the first input of OR gate 26. The voltage at the non-inverting input of comparator 23 falls after all of the energy of inductor 38 is transferred. The output of comparator 23 transitions to a logic zero level when the voltage at the non-inverting input of comparator 23 falls below Vref 5. The logic zero level at the output of comparator 23 allows latch 21 (reset) to enable transistor 42, thus beginning a new cycle. In the preferred embodiment, if a reset signal to latch 21 is not created due to low energy transfer from inductor 38, timer 22 will provide a reset pulse to latch 21 to initiate another output switching sequence.

A frequency clamp circuit 27 controls a maximum frequency at which integrated power factor control circuit 12 operates. The maximum frequency is controlled by a resistor 39, capacitor 41 and reference voltage Vref1. A maximum frequency is introduced to prevent integrated power factor control circuit 12 from generating significant electromagnetic noise.

The voltage control loop of integrated power factor control circuit 12 is purposely designed to be slow in order to create a power factor corrected signal. A typical bandwidth for the voltage control loop is 20 hertz. Since the response time to voltage changes at output 58 is slow, it creates a situation where large voltage swings at output 58 could develop. In general, an overvoltage clamp circuit limits the overshoot at output 58 to a predetermined percentage of the output voltage. In the preferred embodiment, the output voltage is clamped to a maximum of eight percent over the regulated voltage. Comparator 24 is the overvoltage clamp circuit for integrated power factor control circuit 12. Vref4 coupled to inverting input of comparator 24 corresponds to an eight percent overvoltage. The output voltage is sampled via the resistor divider comprising resistors 46 and 47 (at node 56). Comparator 24 sets latch 21 when the voltage at node 56 exceeds Vref4 (corresponding to an eight percent overvoltage). Latch 21 disables transistor 42 which terminates switching.

Transconductance amplifier 16 is used for the voltage control loop, it senses off of node 56 along with the overvoltage clamp circuit (comparator 24) which reduces the number of pins required for integrated power factor control circuit 12. The small bandwidth of the voltage control loop is achieved via a small output current (from transconductance amplifier 16) and capacitor 36 having a large capacitance. A problem with the small bandwidth occurs in response time to load transitions and turn on transients. The overvoltage clamp circuit limits overshoot to a fixed percentage above nominal (the regulated voltage), but this percentage is above the range of the output ripple voltage. In some circumstances the limits placed on overshoot and ripple are too high for load transients which requires the output voltage to be regulated to tighter tolerances. Transconductance amplifier 16 provides a boosted current for rapidly changing its output voltage when node 54 is outside a specified range. The boosted current corresponds to an increase in transconductance (gm) of transconductance amplifier 16. Increasing the transconductance of transconductance amplifier 16 speeds up the voltage loop response and allows a faster response to large changes at output 58. Transconductance amplifier 16 provides a boosted source current for rapidly increasing the voltage at node 54 when the voltage at node 56 exceeds Vref6. Transconductance amplifier 16 provides a boosted sink current for rapidly decreasing the voltage at node 54 when the voltage at node 56 is less than Vref 7. For example, assuming Vref1 is 5 volts, a Vref7 of 5.2 volts will cause a boost condition for sinking current to decrease the voltage at node 54 when output 58 is greater than four percent overvoltage thereby rapidly decreasing the voltage at output 58 (before overvoltage clamping is required). A Vref 6 of 4.5 volts will cause a boost condition for sourcing current to increase the voltage at node 54 when output 58 is ten percent undervoltage to increase the voltage at output 58 thereby maintaining tighter regulation.

Multiplier 18 operates within a predetermined voltage range at node 54. At startup, the voltage at node 54 is out of the predetermined voltage range thus rapidly charging node 54 to the predetermined voltage range, the regulation process can begin. Comparator 17 senses the voltage at node 54 and provides a large current for rapidly charging capacitor 36 if the voltage at node 54 is less than Vref3. For example, if multiplier 18 requires two volts at node 54 to start a regulation process, then the reference voltage Vref3 is 1.7 volts, which is less than the two volts required by multiplier 18. Comparator 17 and transconductance amplifier 16 both charge capacitor 36 under this condition if the voltage at node 54 is less than 1.7 volts. Transconductance amplifier 16 provides the boost current in this condition which further reduces the time to reach the operating voltage range of multiplier 18. Comparator 17 does not provide any current to charge capacitor 36 when the voltage at node 54 exceeds 1.7 volts. Transconductance amplifier 16 provides control over the voltage control loop at this time.

Comparator 17 provides a separate function for low load or no load situations. For example, if a load is removed during a charging cycle the current provided by inductor 38 charges capacitor 44 which possibly creates an overvoltage condition. No load or low loading causes the voltage at output 58 to change at a very slow rate. Any additional charge cycles should be prevented to keep output 58 from going further out of regulation. Transconductance amplifier 16 discharges capacitor 36 since the voltage at node 56 exceeds Vref1 and Vref7. Comparator 17 generates a logic one level at the set input S2 of latch 21 when the voltage at node 54 falls below Vref3. Comparator 17 sets latch 21 (Q output is at a logic one level) preventing transistor 42 from being enabled. In the preferred embodiment, comparator 17 also holds node 54 at 1.7 volts even though transconductance amplifier 16 provides a sink current. Thus comparator 17 provides increased regulation even when the load is decoupled from output 58.

Figure 2:
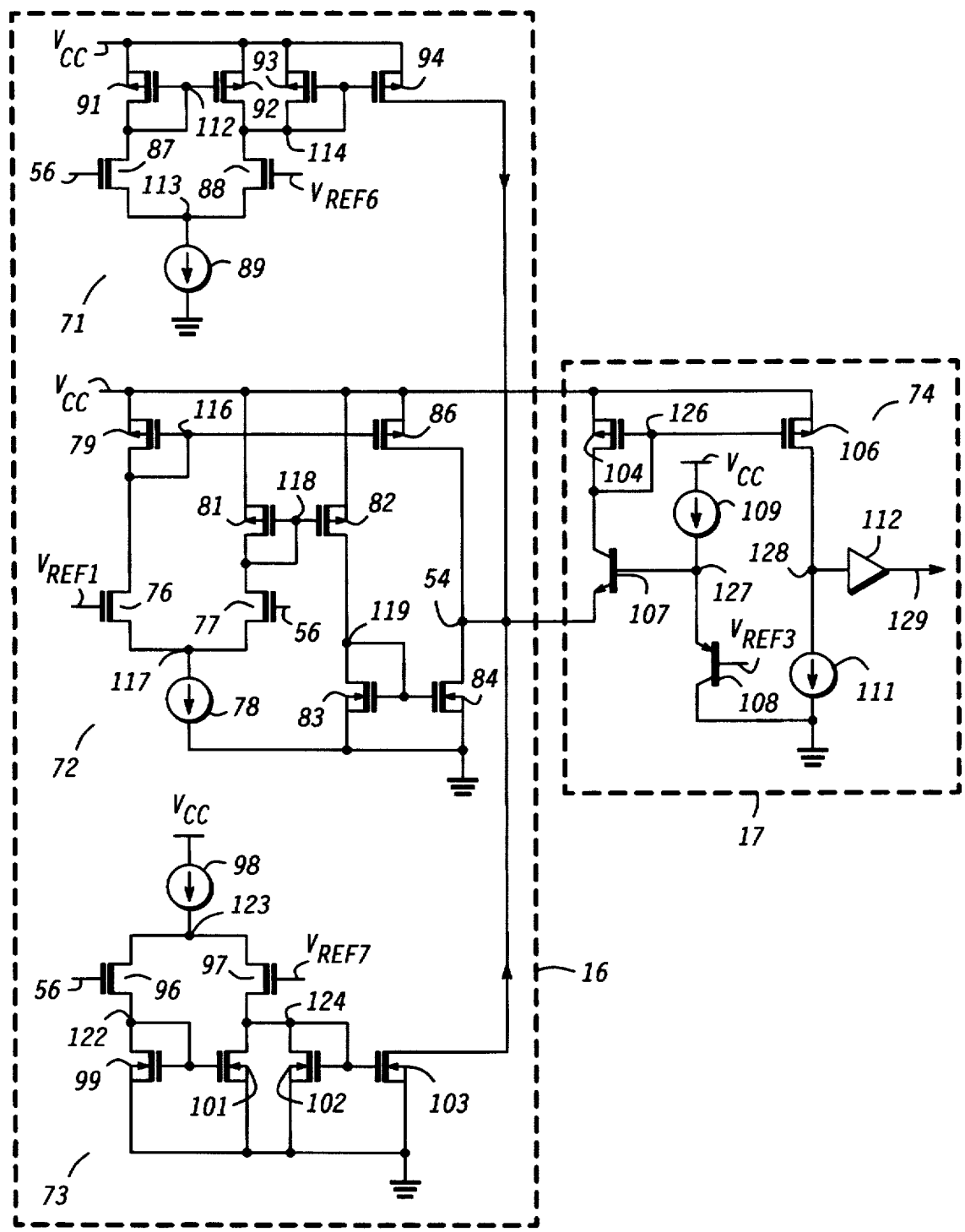
FIG. 2 is a schematic diagram of a transconductance amplifier and a comparator for the integrated power factor control circuit of FIG. 1 in accordance with the present invention.

FIG. 2 is schematic diagram of transconductance amplifier 16 and comparator 17 of FIG. 1 in accordance with the present invention. Transconductance amplifier 16 includes boost circuitry for sinking and sourcing current to increase the speed in which integrated power factor control circuit 12 responds to changes at output 58 of FIG. 1. In the preferred embodiment, Vref6 is less than Vref 1 and Vref7 is greater than Vref1. Comparator 17 includes an output for providing a signal for disabling transistor 42 of FIG. 1 to maintain regulation when no load is detected.

Transconductance amplifier 16 comprises a first boost circuit 71, transconductance amplifier stage 72, and second boost circuit 73. Transconductance amplifier stage 72 includes transistors 76, 77, 79, 81, 82, 83, 84, and 86, and current source 78. Transistors 76, 77, 83, and 84 are n-channel enhancement MOSFETs. Transistors 79, 81, 82, and 86 are p-channel enhancement MOSFETs. Current source 78 provides a bias current and has a first terminal coupled to a node 117 and second terminal coupled to ground. Transistors 76 and 77 form a differential input stage. Transistor 76 has a gate coupled for receiving a reference voltage Vref1, a drain coupled to a node 116, and a source coupled to node 117. Transistor 77 has a gate coupled to node 56 of FIG. 1, a drain coupled to a node 118, and a source coupled to node 117. Transistors 79 and 81 form active loads to the differential input stage. Transistor 79 has a gate and drain coupled to node 116, and a source coupled for receiving a power supply voltage Vcc. Transistor 81 has a gate and drain coupled to node 118, and a source coupled for receiving power supply voltage Vcc.

Transistors 82, 83, 84, and 86 form an output stage for transconductance amplifier stage 72. Transistor 86 has a gate coupled to node 116, a drain coupled to node 54 of FIG. 1, and a source coupled for receiving power supply voltage Vcc. Transistor 82 has a gate coupled to node 118, a drain coupled to a node 119, and a source coupled for receiving power supply Vcc. Transistor 83 has a gate and drain coupled to node 119, and a source coupled to ground. Transistor 84 has a gate coupled to node 119, a drain coupled to node 54 of FIG. 1, and a source coupled to ground.

Transconductance amplifier stage 72 responds to a voltage at node 56 as shown in areas 133–135 of FIG. 3. Transconductance amplifier stage 72 responds linearly when the voltage at node 56 is greater than Vref6 and less than Vref7. A source current from transconductance amplifier stage 72 is limited to a maximum as shown in area 134 for voltages at node 56 less than Vref6. A sink current from transconductance amplifier stage 72 is limited to a minimum as shown in area 135 for voltages at node 56 greater than Vref7. Transconductance amplifier stage 72 does not have sufficient current output to rapidly slew node 54 of FIG. 1 to respond quickly when a voltage at output 58 of FIG. 1 is significantly out of range.

Referring back to FIG. 2, first boost circuit 71 comprises current source 89 and transistors 87, 88, 91, 92, 93, and 94. First boost circuit 71 is a switchable current source for providing a source current (at the output of transconductance amplifier 16) to node 54 when node 56 (inverting input of transconductance amplifier 16) is less than Vref6. Current source 89 has a first terminal coupled to a node 113 and a second terminal coupled to ground. Transistors 87 and 88 form a differential input stage. Transistor 87 has a gate coupled to node 56, a drain coupled to a node 112, and a source coupled to node 113. Transistor 88 has a gate coupled for receiving reference voltage Vref6, a drain coupled to a node 114, and a source coupled to node 113. Transistors 91 and 92 form a current mirror circuit. Transistor 91 has a gate and drain coupled to node 112, and a source coupled for receiving power supply voltage Vcc. Transistor 92 has a gate coupled to node 112, a drain coupled to 114, and a source coupled for receiving power supply voltage Vcc. Transistors 93 and 94 form an output stage of first boost circuit 71 for providing the source current. Transistor 93 has a gate and drain coupled to node 114, and a source coupled for receiving power supply voltage Vcc. Transistor 94 has a gate coupled to node 114, a drain coupled to node 54, and a source coupled for receiving power supply voltage Vcc.

The source current provided by first boost circuit 71 corresponds to area 131 of FIG. 3 and corresponds to a condition when output 58 (FIG. 1) is significantly less than the regulation voltage. Note that first boost circuit provides the source current when the voltage at node 56 is less than Vref6 which raises the voltage at the second inverting input of comparator 19 (FIG. 1) causing inductor 38 (FIG. 1) to store more energy for rapidly raising a voltage at output 58 (FIG. 1).

Referring back to FIG. 2, second boost circuit 73 comprises current source 98 and transistors 96, 97, 99, 101, 102, and 103. Second boost circuit 73 is a switchable current source for providing a sink current (at the output of transconductance amplifier 16) to node 54 when node 56 (inverting input of transconductance amplifier 16) is greater than Vref7. Current source 98 has a first terminal coupled to a node 123 and a second terminal for receiving power supply voltage Vcc. Transistors 96 and 97 form a differential input stage. Transistor 96 has a gate coupled to node 56 a drain coupled to a node 122, and a source coupled to node 123. Transistor 97 has a gate coupled for receiving reference voltage Vref7, a drain coupled to a node 124, and a source coupled to node 123. Transistors 99 and 101 form a current mirror circuit. Transistor 99 has a gate and drain coupled to node 122, and a source coupled to ground. Transistor 101 has a gate coupled to node 122, a drain coupled to 124, and a source coupled to ground. Transistors 102 and 103 form an output stage of second boost circuit 73 for providing the sink current. Transistor 102 has a gate and drain coupled to node 124, and a source coupled to ground. Transistor 103 has a gate coupled to node 124, a drain coupled to node 54, and a source coupled to ground.

The sink current provided by second boost circuit 73 corresponds to area 132 of FIG. 3 and corresponds to a condition when output 58 (FIG. 1) is significantly greater than the regulation voltage. Note that second boost circuit provides the sink current when the voltage at node 56 is greater than Vref7 which decreases the voltage at the second inverting input of comparator 19 (FIG. 1) causing inductor 38 (FIG. 1) to store less energy or terminate switching of transistor 42 (FIG. 1) preventing capacitor 44 from further being charged by inductor 38 (FIG. 1).

A composite of the voltage to current characteristics of transconductance amplifier 16 is shown in FIG. 3. Area 137 corresponds to first boost circuit 71, area 136 corresponds to the linear response of transconductance amplifier stage 72, and area 138 corresponds to second boost circuit 73.

Referring back to FIG. 2, comparator 17 charges capacitor 36 of FIG. 1 during startup to bring the voltage control loop into regulation and senses a no-load condition. Comparator 17 prevents transistor 42 of FIG. 1 from switching under a no-load condition to maintain regulation. Comparator 17 comprises current sources 109 and 111, transistors 104, 106, 107, and 108, and buffer 112. Transistor 107 is a bipolar npn transistor and transistor 108 is a bipolar pnp transistor.

Transistor 107 has a base coupled to a node 127, an emitter coupled to node 54, and a collector coupled to a node 126. The emitter of transistor 107 corresponds to the second output and inverting input of comparator 17. Transistor 104 has a gate and drain coupled to node 126, and a source coupled for receiving power supply voltage Vcc. Current source 109 has first terminal coupled for receiving power supply voltage Vcc and a second terminal coupled to node 127. Transistor 108 has a base coupled for receiving reference voltage Vref3, an emitter coupled to node 127, and a collector coupled to ground. The base of transistor 108 corresponds to the non-inverting input of comparator 17. Transistor 106 has a gate coupled to node 126, a drain coupled to a node 128,, and a source coupled for receiving power supply voltage Vcc. Current source 111 has a first terminal coupled to node 128 and a second terminal coupled to ground. Buffer 112 has an input coupled to node 128 and an output 129. Output 129 of buffer 112 corresponds to the first output of comparator 17 for coupling to the set input S2 of latch 21 (FIG. 1).

The base-emitter junction of transistor 107 becomes forward biased when the voltage at node 54 falls below the reference voltage Vref3. Transistor 107 provides a current for maintaining the voltage at node 54 at a voltage of approximately Vref3 under this condition. Transistors 104 and 106 are configured as a current mirror. Current coupling through transistor 107 is mirrored by transistor 106 for driving node 128 to a logic one level which is buffered by buffer 112 and provided at output 129 (logic one level) of buffer 112. Conversely output 129 is at a logic zero level when no current couples through transistor 107 (current source 111 pulls node 128 to a logic zero level) and is provided at output 129 of buffer 112.

By now it should be appreciated that an integrated power factor control circuit has been provided. The integrated power factor control circuit includes a transconductance amplifier, a multiplier, and a control circuit forming a voltage control loop for generating a regulated DC output voltage. In the preferred embodiment, the DC output voltage is greater than the amplitude of an input AC line voltage signal. The integrated power factor control circuit enables and disables a transistor that charges an inductor for delivering current to a load and storage capacitor.

The transconductance amplifier generates an error signal corresponding to the difference between the DC output voltage and a regulation voltage. The transconductance amplifier includes first and second boost circuits for providing a large sink or source current when the DC output voltage is outside a predetermined range. In the preferred embodiment, the transconductance amplifier compares a voltage proportional to the DC output voltage against a first reference voltage. The first reference voltage corresponds to the regulation voltage. The transconductance amplifier also receives second and third reference voltages corresponding to the end points of the predetermined range.

The transconductance amplifier provides a boosted source current when the voltage proportional to the DC output voltage is less than the second reference voltage. The second reference voltage is less than the first reference voltage and corresponds to a condition when the DC output voltage is less than the regulation voltage. The boosted source current speeds up a response time of the voltage control loop thereby providing more current to the load and storage capacitor which raises the DC output voltage.

Similarly, the transconductance amplifier provides a boosted sink current when the voltage proportional to the DC output voltage is greater than the third reference voltage. The third reference voltage is greater than the first reference voltage and corresponds to a condition when the DC output voltage is greater than the regulation voltage. The boosted source current speeds up the response time of the voltage control loop for disabling the transistor thereby preventing further increases in the DC output voltage and maintaining tighter regulation.

In conjunction with the transconductance amplifier a comparator is added that senses the error signal of the transconductance amplifier for detecting a no-load condition. In startup, the comparator aids in charging a capacitance at the output of the transconductance amplifier (with the boosted source current) to rapidly set up the voltage control loop for providing the regulated voltage. In a no-load condition the storage capacitor does not discharge (since no load is present) and any further charging via the inductor will cause the DC output voltage to increase. The comparator compares the error signal of the transconductance amplifier against a fourth reference voltage. The no-load condition manifests itself by causing the transconductance amplifier to continually reduce a voltage at its output. The comparator generates an output signal that is received by the control circuit for disabling the transistor (to prevent further charging) when the voltage at the output of the transconductance amplifier is less than the fourth reference voltage. The comparator prevents a condition where the DC output voltage severely goes out of regulation and clamps the output voltage of the transconductance amplifier at the fourth reference voltage to maintain the voltage control loop.

In general, a method is provided for increasing the response time of a voltage control loop of a power factor control circuit. A DC output voltage is compared against a first reference voltage by a transconductance amplifier. The transconductance amplifier generates an error signal for maintaining a regulated voltage. The output current of the transconductance amplifier is boosted when the DC output voltage is outside a predetermined range. The time required to generate an error signal is reduced, increasing the voltage control loop response to a change in the DC output voltage.

While specific embodiments of the present invention have been shown and described, further modifications and improvements will occur to those skilled in the art. It is understood that the invention is not limited to the particular forms shown and it is intended for the appended claims to cover all modifications which do not depart from the spirit and scope of this invention.

We claim:

1. An integrated power factor control circuit for making an average AC line current sinusoidal and in phase with an AC line voltage signal, the integrated power factor control circuit enabling and disabling a transistor for generating a DC output voltage from a full-wave rectified AC line voltage signal, the integrated power factor control circuit comprising:

a transconductance amplifier responsive to the DC output voltage for providing an error signal, said transconductance amplifier having a linear voltage to current response within a predetermined voltage range around the DC output voltage and providing a boosted error signal when the DC output voltage is outside said predetermined voltage range for rapidly changing the DC output voltage in a direction towards the predetermined voltage range;

a multiplier having a first input for receiving a voltage proportional to the full-wave rectified AC line voltage signal, a second input for receiving said error signal of said transconductance amplifier, and an output, said multiplier mixes said voltage proportional to the full-wave rectified AC line voltage signal and said error signal of said transconductance amplifier for generating said control signal for making the average AC line current to be sinusoidal and in phase with the AC line voltage signal; and control means responsive to said control signal of said multiplier, a voltage control loop for regulating the DC output voltage being formed by said multiplier, transconductance amplifier, and control means wherein said boosted current of said transconductance amplifier increases a speed in which said voltage control loop responds to changes in the DC output voltage.

2. The integrated power factor control circuit as recited in claim 1 wherein said transconductance amplifier includes an inverting input coupled for receiving a voltage proportional to the DC output voltage, a non-inverting input for receiving a first reference voltage, and an output coupled to said second input of said multiplier for providing said error signal.

3. The integrated power factor control circuit as recited in claim 2 wherein said transconductance amplifier comprises:

- a first boost circuit for providing a source current when said voltage proportional to the DC output voltage is less than a second reference voltage;
- a second boost circuit for providing a sink current when said voltage proportional to the DC output voltage is greater than a third reference voltage; and
- a transconductance amplifier stage for providing said linear voltage to current response when said voltage proportional to the DC output voltage is between said second and third reference voltages.

4. The integrated power factor control circuit as recited in claim 3 wherein said first reference voltage is greater than said second reference voltage and less than said third reference voltage.

5. The integrated power factor control circuit as recited in claim 4 wherein said predetermined voltage range around the DC output voltage in which the transconductance amplifier provides said linear voltage to current response corresponds to an input voltage range of said transconductance amplifier bounded by said second and third reference voltages.

6. The integrated power factor control circuit as recited in claim 5 further including a comparator for comparing said error signal against a fourth reference voltage, said comparator having a non-inverting input coupled for receiving said fourth reference voltage, an inverting input coupled for receiving said error signal, and a first output for providing a no-load signal when said error signal is greater than said fourth reference voltage, said control means being responsive to said no-load signal for disabling the transistor to prevent further voltage increases in the DC output voltage.

7. The integrated power factor control circuit as recited in claim 6 wherein said comparator further includes a second output for driving said second input of said multiplier to a voltage equal to said fourth reference voltage.

8. A method for increasing a response time of a voltage control loop of a power factor control circuit, the power factor control circuit providing a DC output voltage, the method comprising:

- comparing a voltage corresponding to the DC output voltage against a first reference voltage and providing an error signal having a linear voltage to current response within a predetermined voltage range around the DC output voltage, the linear voltage to current response allows the voltage control loop to regulate the DC output voltage in response to said error signal; and
- boosting said error signal when the DC output voltage is outside said predetermined voltage range such that a non-linear voltage to current response allows the voltage control loop to rapidly change the DC output voltage in a direction that reduces said error signal until the DC output voltage is within said predetermined voltage range wherein the linear voltage to current response is provided for regulating the DC output voltage.

9. The method as recited in claim 8 wherein said step of boosting an output current of said transconductance amplifier further includes the steps of:

- comparing said voltage corresponding to the DC output voltage against a second reference voltage; and
- boosting said error signal when said voltage corresponding to the DC output voltage is less than said second reference voltage such that said non-linear voltage to current response rapidly increases the DC output voltage to said predetermined voltage range.

10. The method as recited in claim 9 wherein said step of boosting an output current of said transconductance amplifier further includes the steps of:

- comparing said voltage corresponding to the DC output voltage against a third reference voltage; and
- boosting said error signal when said voltage corresponding to the DC output voltage is greater than a third reference voltage such that said non-linear voltage current response rapidly decreases the DC output voltage to said predetermined voltage range.

11. An integrated power factor control circuit for making an average AC line current sinusoidal and in phase with an AC line voltage signal, the integrated power factor control circuit enabling and disabling a transistor for generating a DC output voltage from a full-wave rectified AC line voltage signal, the integrated power factor control circuit comprising:

- a transconductance amplifier responsive to the DC output voltage for providing an error signal, said transconductance amplifier having a linear voltage to current response within a predetermined voltage range around the DC output voltage and providing a boosted error signal when the DC output voltage is outside said predetermined voltage range for rapidly changing the DC output voltage in a direction towards the predetermined voltage range;
- a multiplier having a first input for receiving a voltage proportional to the full-wave rectified AC line voltage signal, a second input for receiving said error signal of said transconductance amplifier, and an output, said multiplier mixes said voltage proportional to the full-wave rectified AC line voltage signal and said error signal of said transconductance amplifier for generating said control signal for making the average. AC line current to be sinusoidal and in phase with the AC line voltage signal;
- a comparator responsive to said error signal of said transconductance amplifier for providing a no-load signal when said error signal is less than a reference signal; and
- control means responsive to said control signal of said multiplier, a voltage control loop for regulating the DC output voltage being formed by said multiplier, transconductance amplifier, and control means wherein said boosted current of said transconductance amplifier increases a speed in which said voltage control loop responds to changes in the DC output voltage, said control means being responsive to said no-load signal of said comparator for disabling the transistor to prevent further increases in the DC output voltage under a no-load condition.

* * * * *

UNITED STATES PATENT AND TRADEMARK OFFICE
CERTIFICATE OF CORRECTION

PATENT NO.   : 5,502,370
DATED        : March 26, 1996
INVENTOR(S)  : Jeff W. Hall et al.

It is certified that error appears in the above-indentified patent and that said Letters Patent is hereby corrected as shown below:

In claim 11, column 12, line 41, delete "." after "average".

Signed and Sealed this

Twenty-second Day of July, 1997

Attest:

BRUCE LEHMAN

*Attesting Officer*   *Commissioner of Patents and Trademarks*